United States Patent [19]

Kuehnle

[11] 3,743,817

[45] July 3, 1973

[54] DATA CARD TERMINAL

[75] Inventor: Manfred R. Kuehnle, Lexington, Mass.

[73] Assignee: Audac Corporation, Burlington, Mass.

[22] Filed: Nov. 12, 1970

[21] Appl. No.: 88,801

[52] U.S. Cl. .................. 235/61.11 J, 73/37, 73/156, 137/83, 137/624.11

[51] Int. Cl. ........ G06k 7/00, G06k 7/02, F15b 5/00

[58] Field of Search .................. 235/61.11 J, 201 FS, 235/201 PF; 137/83, 624.11; 73/37, 156; 91/36, 37

[56] References Cited

UNITED STATES PATENTS

| | | | |
|---|---|---|---|
| 3,417,232 | 12/1968 | Lukoff et al. | 235/61.11 J |
| 3,602,139 | 8/1971 | Allport | 235/61.7 B X |
| 3,443,238 | 3/1969 | Nightingale | 235/201 FS |
| 3,452,358 | 6/1969 | Zehner | 235/61.12 M |
| 3,017,463 | 1/1962 | Dinsmore et al. | 340/365 P X |
| 3,114,035 | 12/1963 | Avery | 235/61.11 J |
| 3,366,043 | 1/1968 | Fitch | 235/61.11 J |
| 3,550,431 | 12/1970 | Cotta et al. | 235/201 FS |
| 3,515,858 | 6/1970 | Weaver | 235/61.11 J |

*Primary Examiner*—Maynard R. Wilbur
*Assistant Examiner*—Thomas J. Sloyan
*Attorney*—Arthur Jacob

[57] ABSTRACT

A data card reading system employs a read head arranged to scan embossed characters on a data card. The character at each character location on the card is composed of a number of embossed segments and the identity of the character is determined by the placement of the segments at a given character location. The read head contains an array of nozzles through which air issues toward the card. When the head is opposite each character location on the card, the nozzles are arranged to direct air toward different parts of that location at which character identifying segments might be. The presence of a character identifying segment opposite a particular nozzle is reflected by a change in back pressure at that nozzle. These pressure changes are detected to develop an electrical analog of the character on the card for transmittal to a remote location via telephone lines.

3 Claims, 3 Drawing Figures

MANFRED R. KUEHNLE
*Inventor*
*By* CESARI & McKENNA
*Attorneys*

DATA CARD TERMINAL

BACKGROUND OF THE INVENTION

1. Field of the Invention

This invention relates to a system for relaying over telephone lines information which is derived at least partly from a data card. It relates more particularly to an improved data card reading terminal by which information on a card or similar article can be transmitted to a remote location. It has particular application in connection with a credit card system by which one may transmit embossed information on a credit card to a central processor in order to obtain instantaneous verification of a particular credit card transaction. The embossed characters on the card may be numbers, letters, or simply bars arranged in a binary code.

2. Description of the Prior Art

There are in existence different types of terminals which are able to read embossed data on a card. One type of which we are aware employs an array of feeler switches which are biased toward the character locations on the card. An embossed character depresses selected ones of these switches so that an electrical analog is developed corresponding to the particular character.

This prior system has drawbacks such as cost, complexity, reliability and maintenance difficulties, which, as a practical matter, limit its wider application.

SUMMARY OF THE INVENTION

The present invention aims to provide a system which facilitates the transmittal of embossed information on a data card or similar article to a remote location.

Another object of the invention is to provide a data terminal which is able to read embossed information on a data card relatively quickly and reliably.

Another object of the invention is to provide a terminal of this type which is relatively inexpensive to make and maintain.

Another object of the invention is to provide a data terminal which is able to read a wide variety of data cards presently in use.

Yet another object of the invention is to provide a card reading terminal which is able to read embossed identification data on a conventional credit card.

Another object is to provide an improved method of reading embossed information on a data card.

Other objects will in part be obvious and will in part appear hereinafter.

The invention accordingly comprises the several steps and the relation of one or more of such steps with respect to each of the others and the apparatus embodying the features of construction, combination of elements and arrangement of parts which are adapted to effect such steps, all as exemplified in the following detailed disclosure, and the scope of the invention will be indicated in the claims.

In general, a terminal is connected by way of telephone lines to a remote location or, more particularly, to a central processor at that location. After a data card is positioned in the terminal, the operator who is using the terminal dials the telephone number of the remote location. Then, when the telephone connection is completed, he transmits data identifying the particular terminal from which the information is being sent. Finally, he initiates the terminal READ mode so that it reads the data on the card and transmits corresponding electrical signals over the telephone lines to the remote location. The dialing and identification operations can be performed either manually or automatically by a system such as the one described in copending application Ser. No. 749,557, filed July 17, 1968, now U.S. Pat. No. 3,617,638 which is owned by the assignee of the present application.

During the terminal's READ mode, the read head scans the embossed data on the card, e.g., the card holder's identification number. The number at each character location is determined by the relative placement of the various embossed segments making up the character. For example, in the case of a type 7B Farrington font, it is determined by the placement of up to seven such segments.

The read head contains an array of fluidic nozzles. In the present example of the 7B Farrington font, there are seven such nozzles. Air is supplied to these nozzles so that seven very small air streams are aimed toward different parts of the character location as the head moves opposite that location. The card proper is spaced only a small distance from the nozzles so that a certain amount of back pressure is normally developed at each nozzle. This "normal" back pressure appears at the end of a sensing conduit leading from each nozzle. A pressure-responsive device at the end of each conduit develops an electrical signal (or no signal) which corresponds to this "normal" back pressure. For example, the device may be a normally open pressure-responsive switch in circuit with a voltage source. Alternatively, it may simply be a flexible reed over the end of the conduit which can be deflected so as to interrupt a beam of light incident on a photocell. In any event, the sensing device produces an electrical signal (or no signal) which is indicative of the fact that there is no embossed character identifying segment opposite that particular nozzle.

However, when the read head is opposite a character location on the card which contains an embossed character, certain ones of the seven possible segments that make up all of the characters in the font are disposed opposite certain ones of the nozzles. The presence of each embossed segment changes the gap between the card and the corresponding nozzle, thereby changing the back pressure at that nozzle. This is reflected by a change in the output of the sensing device associated with that nozzle. The outputs of the sensing devices associated with all seven nozzles, taken together, establish the identity of the character at that particular location on the card.

This process is repeated at each character location on the card so that at the end of a complete pass of the read head, the terminal has developed an electrical analog corresponding to all of the digits making up the number on the card which is immediately sent over the telephone lines to the remote location.

The present fluidic card reading system is relatively simple; yet it is able to read accurately the embossed data on the cards even though there may be some variation in the heights of the emboossings. On the other hand, the system is not so sensitive that it responds to dirt or other deposits on the cards. The terminal is also relatively easy to make, particularly since the head contains essentially no moving parts. For the same reason, it suffers little down time and consequently is relatively easy to maintain in proper operating condition.

BRIEF DESCRIPTION OF THE DRAWING

For a fuller understanding of the nature and objects of the invention, reference should be had to the following detailed disclosure taken in connection with the accompanying drawing, in which.

DESCRIPTION OF THE PREFERRED EMBODIMENTS

Figures 1, 2, 3:
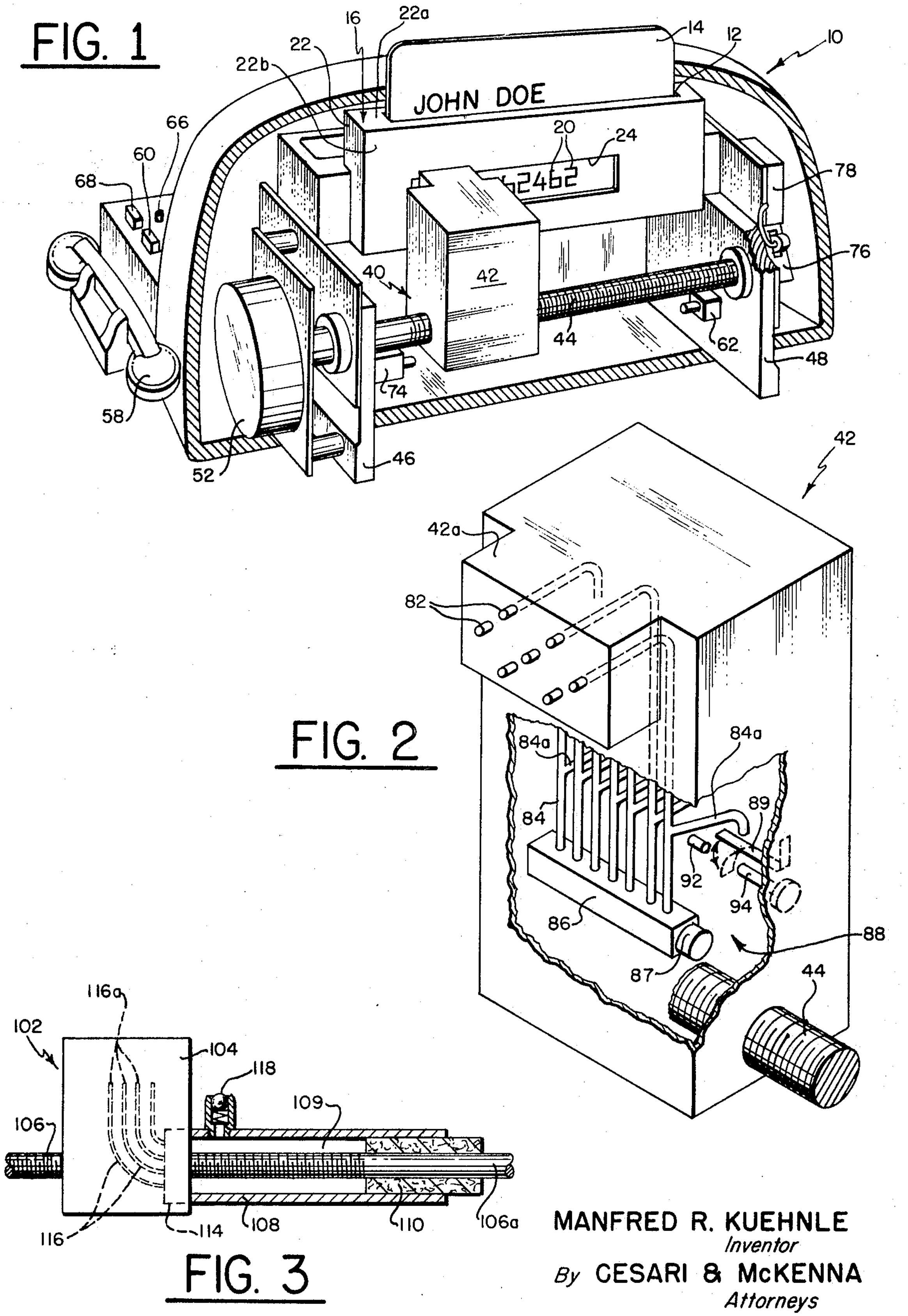
FIG. 1 is an isometric view with the parts cut away of an embossed card reading system embodying the principles of this invention.
FIG. 2 is an isometric view on a larger scale and with parts broken away of the read head in the FIG. 1 system and FIG. 3 is a fragmentary sectional view with parts in elevation of a modified scanning assembly used with the FIG. 1 system.

Referring first to FIG. 1 of the drawing, a data terminal shown generally at 10 has a relatively wide slot 12 for receiving a data card 14 in a card positioning assembly shown generally at 16. Card 14 carries certain data in the form of embossings shown generally at 18. In the present illustration, card 14 is a credit card and the embossings 18 form a series of digits making up a card identification number. In this example, the digits correspond to a type 7B Farrington optical font. With this particular font, the digits from 0 to 9 are all formed of up to seven line segments.

It should be understood, however, that the data on card 14 could be in the form of letters, shapes, bars in a bar code or any other embossings.

Assembly 16 consists primarily of a relatively wide positioning block 22. A card receiving slot 12 extends down vertically from the top wall **22*a* of block 22 almost all the way through the block. Also, a window 24 is formed in the front of the block as it appears in FIG. 1. The area of this window corresponds to the card 14 area devoted to embossed information. Thus, when card 14 is inserted into slot 12, its identification number is visible through window 24 as shown in FIG. 1**.

A scanning assembly shown generally at 40 is arranged to scan the embossed characters visible in window 24 so as to develop corresponding electrical signals for transmission over conventional telephone lines to a remote location. A suitable system for developing these signals is described in detail in the aforesaid application Ser. No. 749,557, now U.S. Pat. No. 3,617,638. Therefore, we will not describe the procedure in detail here.

Assembly 40 includes a read head 42 to be described later which is mounted for lengthwise movement on a lead screw 44. Lead screw 44 is rotatively mounted on a pair of vertically oriented end plates 46 and 48 in terminal 10. These plates also support the card positioning assembly 16. One end, i.e., the left end, of screw 44 is connected to a suitable electric motor 52 mounted on end plate 46. Motor 52 is reversible so that the lead screw can be rotated in either direction to move the head 42 in one direction or the other along the screw.

When the operator wishes to establish a telephone link initially with a particular remote location, he picks up a conventional handset 58 on terminal 10 and depresses a DIAL button 60 on the terminal. This causes the terminal to automatically dial the remote location. When a telephone link is established, the remote location issues a signal to the terminal 10 which turns on an indicator light 66 next to button 60. This apprises the operator that the proper connection has been made and that he can identify his terminal and then commence transmitting the data on card 14.

To transmit the data, the operator depresses a READ button 68 on the terminal. This turns on motor 52 which rotates lead screw 44 so that head 42 moves from left to right as shown in FIG. 1. As the head passes each character location on card 14, it develops electrical signals corresponding to the identity of the character at that location. This information is immediately converted to tone codes which are transmitted over the telephone lines to the remote location as described in the pending application noted above.

After head 42 has traveled rightward beyond the embossed digits on card 14, it actuates a microswitch 62 mounted on plate 48. This causes motor 52 to reverse direction so that the head 42 returns to its orginal position, at the left-hand end of screw 44. When it reaches this position, it actuates a microswitch 74 which turns off motor 52. Thus, the head is ready to read the number on another card 14 inserted into the terminal. If there is a problem with a particular card, a person at the remote location can talk directly with the operator over handset 58. When all the data has been sent, the operator replaces handset 58 which breaks the connection to the remote location.

As has been explained in detail in the aforesaid application Ser. No. 749,557, now U.S. Pat. No. 3,617,638 the pitch of lead screw 44 is selected so that one rotation of the screw causes head 42 to travel along the screw a distance equal to one character location on card 14. A timing cam 76 is mounted on the other end of screw 44 from motor 52. Cam 76 is shaped so that it turns on switch 78 only when head 42 is directly opposite the center of each character location on card 14. This assures that the output of the terminal is a series of distinct signals, each of which represents one digit in the identification number on the card.

Turning now to FIG. 2, head 42 has a nose portion **42*a* which projects toward window 24 (FIG. 1). Fluidic nozzles 82 are mounted in nose portion 42*a*, projecting out slightly therefrom as shown in FIG. 2. In the present example wherein the numbers on card 14 are the Farrington Style 7B font, there are seven such nozzles 82. They are arranged so that when the head 42** is opposite a character location on the card, each one of the nozzles is opposite one of the seven possible segments comprising the character at that location.

Each nozzle 82 is connected by a tube 84 to a manifold 86. Tubes 84 can be conventional hypodermic tubing. Naturally, the nozzles 82 can simply be extensions of that tubing. A pump 87 connected to the end of manifold 86 delivers air to the manifold at constant pressure which is then distributed to the various nozzles 82. Pump 87 can be quite small since it only has to deliver a relatively small volume of air, on the order of 1 cc. per second.

Each tube 84 has a branch **84*a* which leads to a pressure detector indicated generally at 88. For purposes of clarity, we have illustrated specifically only the detector 88 associated with the extreme right-hand nozzle 82. The detector 88 can be any one of a number of devices capable of developing an electrical signal in response to a change in pressure. The one specifically shown in FIG. 2 comprises a flexible, resilient reed 89 which is connected at one end to the wall of head 42** and extends under the open end of branch 84a. A lamp 92 over reed 89 directs a beam of light toward a photocell 94.

Normally, the reed 89 assumes the solid line position shown in FIG. 2 so that it does not interrupt the beam of light projected by lamp 92 toward photocell 94. However, when the back pressure at branch 84a increases due to a raised character segment being brought opposite the associated nozzle 82, the reed 89 deflects downwardly to the position shown in dotted lines so that it interrupts the beam of light from the lamp. This interruption is reflected in the output of the photocell.

Thus, during operation of the system, when the head 42 is centered at each character location, selected ones of the nozzles 82 are obstructed by embossed character segments at those locations. The particular nozzles 82 so obstructed depend, of course, upon the character at that location. The back pressure at the end of the branch 84a associated with the nozzle so obstructed increases thereby deflecting the reed 89 at the end of that branch and interrupting the beam of light incident on the associated photocell 94. Accordingly, the outputs of all of the photocells 94, together represent the particular character at the location opposite head 42.

The outputs of photocells 94 are used to generate tone codes as disclosed in the aforesaid copending application and these tone codes are, in turn, transmitted via telephone lines to the remote location where they are decoded to form the associated character. location.

As head 42 scans across the card, each time it centers on a character location, a similar set of signals is developed which reflects the character at that location. Thus, by the time head 42 has completed a pass across the card, all of the information on the card has been transmitted to the remote location. Whereupon head 42 returns to its original location at the left-hand end of lead screw 44. The operator then returns handset 58 to its cradle, thereby disconnecting the unit from the remote lcation. Finally, he removes card 14 and returns it to the customer.

Referring now to FIG. 3, instead of using a separate pump 87 to deliver air to the nozzles 82, it may be desirable to construct the scanning assembly so that movement of the read head along the screw develops the pressurized air needed to operate the system. Such a scanning assembly is shown generally at 102. In this arrangement, a read head 104 travels back and forth on a lead screw 106. A tube 108 extends out from the right-hand side of head 104, as seen in FIG. 3, coaxially with screw 106. Tube 108 is substantially larger in diameter than the lead screw so that together with the screw it defines annular space 109.

A sleeve-like gasket 110 made of suitable resilient gasketing material is installed on the unthreaded portion 106a of the lead screw 106. Thus, when screw 106 turns in the direction causing head 104 to move to the right, air within the space 109 is compressed and forced into a manifold 114 in head 104 which communicates with space 109. From there, the air is forced into conduits 116 leading to the various fluidic nozzles 116a in the read head. It should be understood that the travel of head 104 is sufficient to scan all of the character locations on the particular data card being read. A ball check valve 118 is provided in tube 108 to permit air to enter chamber 109 when head 104 returns to the lefthand end of lead screw 106.

Thus, the FIG. 3 embodiment of the scanning assembly 102 provides a highly efficient, compact, wholly mechanical pump which delivers the air necessary to read the data cards. In all other respects, it operates in the same way as does assembly 40 described above.

It will be seen from the foregoing then that the subject terminal is able to read embossed information on a data card quickly and reliably. Its output responds accurately to the embossed information on the card and generates the correct output even though the height of the embossings may vary.

Also, while we have specifically shown a terminal which responds to the raised bosses on a data card, the unit will respond equally well to depressions on a card. In other words, when a card is embossed, one side of it has raised segments and the other side of it has depressed segments. When depressions are brought opposite nozzles 82, they produce a change in the back pressures at the ends of the corresponding branches 84a in the same way described above. In this case, however, the back pressure is reduced when a particular nozzle 82 is opposite a depressed segment. Accordingly when the terminal is intended to read these depressions, the reed 89 should be biased away from branch 84a to the dotted line position shown in FIG. 2 so that no light impinges onto the associated photocell 94. Then, when the associated nozzle 82 is opposite a depressed segment at a particular character location, the pressure at the associated branch 84a is reduced so that the reed 89 moves to the solid line position shown in FIG. 2. Whereupon light 92 shines on the photocell 94, thereby producing an output.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

What is claimed is:

1. A system for reading embossed characters on a data card or the like comprising:

a card holder;

a read head positioned opposite the card holder for reading the characters on a card therein;

a plurality of fluid nozzles in the head and opening opposite the holder, said nozzles being arranged to detect a corresponding number of embossed segments making up the embossed characters in a character font;

a piston pump activated by relative movement of the head and holder, and a separate fluid conduit connecting the output of the pump to each of said nozzles for supplying fluid to the nozzles;

means associated with each nozzle for detecting the back pressure at that nozzle, said detecting means producing an indication wherever the corresponding nozzle is opposite a character segment so that the outputs of all the detecting means reflect the particular character; and means for moving the head and holder relative to one another so that the system can read a succession of such characters on a card in the holder, the head moving means including a rotatable lead screw threaded through the head and a sleevelike piston member mounted on the screw;

the head including a tube extending coaxially with the screw and slidably engaging over the piston member, each conduit being connected between the tube and a nozzle so that when the head moves along the screw toward the piston member, fluid is compressed in the tube and driven out through the nozzles.

2. The system defined in claim 1 and further including a check valve mounted on the head which opens when the head moves away from the piston member so that fluid can enter the tube.

3. The system defined in claim 1 wherein the detecting means include

A. an open ended branch connecting to each conduit, and

B. a pressure responsive device at the open end of each branch.

* * * * *